United States Patent
Jalali et al.

(10) Patent No.: US 11,301,639 B2
(45) Date of Patent: Apr. 12, 2022

(54) METHODS AND SYSTEMS FOR GENERATING A REFERENCE DATA STRUCTURE FOR ANONYMIZATION OF TEXT DATA

(71) Applicants: Roozbeh Jalali, Markham (CA); Haolin Guo, Markham (CA); Wen Chen, Markham (CA); Michael Chih Hung Li, Markham (CA); Zanqing Zhang, Markham (CA)

(72) Inventors: Roozbeh Jalali, Markham (CA); Haolin Guo, Markham (CA); Wen Chen, Markham (CA); Michael Chih Hung Li, Markham (CA); Zanqing Zhang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/913,711

(22) Filed: Jun. 26, 2020

(65) Prior Publication Data
US 2021/0406474 A1    Dec. 30, 2021

(51) Int. Cl.
*G06F 17/00*    (2019.01)
*G06F 40/30*    (2020.01)
(Continued)

(52) U.S. Cl.
CPC ............ *G06F 40/30* (2020.01); *G06F 40/166* (2020.01); *G06F 40/247* (2020.01);
(Continued)

(58) Field of Classification Search
CPC ...... G06F 40/30; G06F 40/247; G06F 40/166; G06F 40/284; G06F 40/47; G06N 20/00
See application file for complete search history.

(56) References Cited

U.S. PATENT DOCUMENTS

| | | | |
|---|---|---|---|
| 8,688,697 B1 * | 4/2014 | Nayar | G06F 16/285 707/731 |
| 2003/0177000 A1 * | 9/2003 | Mao | G06F 40/247 704/9 |

(Continued)

FOREIGN PATENT DOCUMENTS

| | | |
|---|---|---|
| CN | 106874788 A | 6/2017 |
| CN | 109711186 A | 5/2019 |

(Continued)

OTHER PUBLICATIONS

Abril et al., Towards a private vector space model for confidential documents, SAC, 2012, p. 944-945 (Year: 2012).*
(Continued)

*Primary Examiner* — Andrew T McIntosh

(57) ABSTRACT

A method and a system of using machine learning to automatically generate a reference data structure for a K-anonymity model. A vector space is generated from reference text data, where the vector space is defined by numerical vectors representative of semantic meanings of the reference text words. Input text words are converted into numerical vectors using the vector space. Word clusters are formed according to semantic similarity between the input text words, where the semantic similarity between pairs of input text words is represented by metric values determined from pairs of numerical vectors. The word clusters define nodes of the reference data structure. A text label is applied to each node of the reference data structure, where the text label is representative of the semantic meaning shared by elements of the word cluster.

20 Claims, 9 Drawing Sheets

(51) Int. Cl.
    *G06F 40/166*      (2020.01)
    *G06N 20/00*      (2019.01)
    *G06F 40/47*      (2020.01)
    *G06F 40/284*      (2020.01)
    *G06F 40/247*      (2020.01)

(52) U.S. Cl.
    CPC ............ *G06F 40/284* (2020.01); *G06F 40/47* (2020.01); *G06N 20/00* (2019.01)

(56) References Cited

U.S. PATENT DOCUMENTS

| | | | |
|---|---|---|---|
| 2009/0037440 A1* | 2/2009 | Will | G06K 9/6219 |
| 2016/0092557 A1* | 3/2016 | Stojanovic | G06F 16/254 |
| | | | 707/723 |
| 2016/0132487 A1* | 5/2016 | Nauze | G06F 16/36 |
| | | | 704/4 |
| 2019/0156061 A1 | 5/2019 | Chakraborty et al. | |
| 2020/0043022 A1* | 2/2020 | Karmakar | G06F 16/355 |

FOREIGN PATENT DOCUMENTS

| | | |
|---|---|---|
| CN | 109804379 A | 5/2019 |
| JP | 2016149099 A | 8/2016 |

OTHER PUBLICATIONS

Lasko et al., Spectral Anonymization of Data, IEEE, 2010, p. 437-446 (Year: 2010).*

Torra et al., Spherical micraggregation: Anonymizing sparse vector spaces, Elsevier, 2014, p. 28-44 (Year: 2014).*

Flati, Tiziano, et al. "MultiWiBi: The multilingual Wikipedia bitaxonomy project." Artificial Intelligence 241 (2016): 66-102.

Miller, George A., et al. "Introduction to WordNet: An on-line lexical database." International journal of lexicography 3.4 (1990): 235-244.

Mikolov, Tomas, et al. "Distributed representations of words and phrases and their compositionality." Advances in neural information processing systems. 2013.

* cited by examiner

| Names | Formula |
|---|---|
| Euclidean distance | $\|a-b\|_2 = \sqrt{\sum_i (a_i - b_i)^2}$ |
| Squared Euclidean distance | $\|a-b\|_2^2 = \sum_i (a_i - b_i)^2$ |
| Manhattan distance | $\|a-b\|_1 = \sum_i |a_i - b_i|$ |
| Maximum distance | $\|a-b\|_\infty = \max_i |a_i - b_i|$ |
| Mahalanobis distance | $\sqrt{(a-b)^T S^{-1}(a-b)}$ where $S$ is the Covariance matrix |

FIG. 7

| Names | Formula |
|---|---|
| Maximum or complete-linkage clustering | $max\{d(a,b) : a \in A, b \in B\}$ |
| Minimum or single-linkage clustering | $min\{d(a,b) : a \in A, b \in B\}$ |
| Unweight average linkage clustering (or UPGMA) | $\frac{1}{|A|\cdot|B|} \sum_{a \in A} \sum_{b \in B} d(a,b)$ |
| Weighted average linkage clustering (or WPGMA) | $d(i \cup j, k) = \frac{d(i,k)+d(j,k)}{2}$ |
| Centroid linkage clustering, or UPGMC | $\|c_s - c_t\|$ where $c_s$ and $c_t$ are the centroids of clusters $s$ and $t$, respectively |

FIG. 8

METHODS AND SYSTEMS FOR GENERATING A REFERENCE DATA STRUCTURE FOR ANONYMIZATION OF TEXT DATA

RELATED PATENT APPLICATIONS

This is the first filing of this patent application.

FIELD

The present disclosure relates to methods for generating a reference data structure, particularly a reference data structure used for anonymization of text data, and systems for the same.

BACKGROUND

With the advent of technology, data generation has increased at an unprecedented pace across all disciplines. At least one of the major challenges that comes with the rapidly increasing amount of data is the provision of data privacy. Data anonymization is one of the techniques that can be used to preserve privacy and to ensure protection against disclosure of individual identity or their sensitive information.

One of the methods used to achieve data anonymization is the K-anonymity model, which, broadly speaking, is a generalization technique that is used to describe the dataset level of anonymity. The K-anonymity model assumes that the records in a given dataset may be in a structured format arranged in the form of a table with rows representing individual records and columns containing attributes of each record. The process of anonymization involves replacing an attribute value that functions as a specific identifier with a generalized term that is less specific. Thus, the main objective of the K-anonymity model is to transform a dataset such that association between records and their corresponding entities cannot be determined with a probability greater than 1/K (K being a number of records). To this end, any K-anonymity model requires that records in a dataset be divided into a set of clusters, each of which contain at least K records so that each record is indistinct from at least (K−1) other records. To enhance data quality, it is also desirable for the records in a given cluster to be as similar to each other as possible. This would help to reduce data distortion when the records in a cluster are modified to have the same generalized term.

Some attributes, such as those containing numeric values, may be easily generalized into numeric intervals. Other attributes, such as those with text-based values, are more difficult to generalize. Typically, when applying K-anonymity to a dataset containing text-based attributes, the text values of some or all of the attributes would be generalized and replaced by similar values that are, for example, semantically consistent but less specific.

However, over generalization may exacerbate the distortion of data. One of the techniques that can be used to enhance the K-anonymity implementation is to generate a reference data structure, such as a categorical hierarchy tree from the data. This reference data structure may cluster similar entities together in a way that the entities in one cluster is more similar to each other than the rest of the entities in other clusters. More importantly, each cluster in the reference data structure could be identified with a generalized term that can also serve as a meaningful name to represent the entire cluster and can be used to replace any member of the same cluster. The generalized terms of clusters in the same reference data structure level can then be further generalized into a higher levels, thus help to reduce data distortion.

Currently a reference data structure for a K-anonymity model is typically manually generated, which is a time-consuming task. A different reference data structure would be required for each new domain, and rich specialized knowledge of each domain is needed to generate the generalized terms required. The pre-made reference data structure for the different domains may need to be delivered along with the dataset, which increases the data size.

Moreover, extensive knowledge regarding word taxonomy and semantic meaning of words and phrases are needed. One of the big challenges for pre-existing reference data structure generation for text data is the grouping of words that have multiple context dependent meanings.

Thus, there is a need for an improved method and system of K-anonymity reference data structure generation.

SUMMARY

In various examples, the present disclosure describes, in at least one aspect, methods for automatic generation of a K-anonymity reference data structure for text-based data. The disclosed method may be able to utilize machine learning techniques to generate a vector space which may be used to convert input text data into numerical values, and automatically cluster similar data records and generate a reference data structure with a meaningful identifier for each cluster where the identifier can represent the cluster semantically.

In a further aspect, the methods disclosed herein may automatically generate a K-anonymity reference data structure is not limited to the English language, and may be capable of supporting text-based data in multiple languages.

In a still further aspect, the methods of automatic generation of a reference data structure for data may provide savings in terms of processing cost and/or remove the need for intensive human efforts. Specifically, the methods disclosed herein may obviate the need for time-intensive manual efforts demanded by manual creation of a reference data structure. Further, the automatically generated reference data structure in accordance with the present disclosure may also be updated (e.g., to reflect an updated text corpus) in a shorter period of time, compared with existing techniques.

In a still further aspect, new or additional information (e.g., new semantic meanings of textual sequences) may be relatively easily represented in an updated reference data structure by re-training the vector space (representing the latent code space of textual sequences) on any given textual context.

In a further aspect, the reference data structure generated in accordance with the present disclosure may be generated as needed without the need for extra files to be delivered to clients who are using K-anonymity for anonymization.

In a further aspect, the methods in accordance with the present disclosure may generate a reference data structure based on the input text data without the need for creating a large reference data structure for different semantic contexts. This may enable the size of reference data structure to be decreased (compared with existing techniques), which may serve to enhance its searching capability (e.g., requiring fewer processing resources to perform a search of the reference data).

In a further aspect, the present disclosure relates to a method for generating a reference data structure for input text data comprising a plurality of input text words. The method includes: generating a vector space from reference text data comprising a plurality of reference text words, wherein the vector space is defined by numerical vectors representative of semantic meanings of the reference text words; converting the plurality of input text words into respective numerical vectors using the vector space; forming the plurality of input text words into word clusters according to semantic similarity between the input text words, the word clusters defining respective nodes of the reference data structure, the semantic similarity between pairs of input text words being represented by respective metric values determined from respective pairs of numerical vectors, the metric values being used to determine whether a clustering criterion is satisfied; applying, to each node of the reference data structure, a text label, the text label being representative of the semantic meaning shared by elements of the word cluster; and storing the reference data structure.

In any of the above, the method may include, for each given word of the input text data, replacing the given word with the text label of the word cluster to which the given word belongs.

In any of the above, the metric value may be one of Euclidean distance, squared Euclidean distance, Manhattan distance, maximum distance, and Mahalanobis distance.

In any of the above, forming the plurality of words of the input text data into word clusters may include: initializing the word clusters such that each root word of a plurality of root words converted from the plurality of words of the input text data forms an element of each of the word clusters; iteratively forming the word clusters, each iteration comprising: determining a metric value between each pair of word clusters based on the numerical vectors of each of the pair of word clusters; and merging two of the word clusters into a single word cluster when the metric value determined from the two word clusters satisfies a clustering criterion.

In any of the above, forming the plurality of words of the input text data into word clusters may include: initializing a single word cluster comprising all root words generated from the plurality of words of the input text data, the single word cluster is defined as a parent cluster; iteratively forming the word clusters, each iteration comprising: identifying potential word clusters from the parent cluster by applying a flat clustering algorithm; and splitting one of the potential word clusters from the parent cluster to form a new word cluster.

In any of the above, the clustering criterion may be one of maximum linkage clustering, minimum clustering, unweight average linkage clustering, weighted average linkage clustering, minimum energy clustering, sum of all intra-cluster variance, Ward's criterion, V-linkage, graph degree linkage, and the increment of some cluster descriptor.

In any of the above, the text label may be a common hyponym of the elements of the word cluster.

In any of the above, the input text data may be in a first language, and the method may include: translating words in the input text data from the first language into a second language; determining the common hyponym in the second language using the translated words in the second language; and translating the common hyponym in the second language into the first language, and the translated term in the first language is used to as the text label for the word cluster.

In any of the above, generating of the vector space may include: collecting a corpus of documents to form the reference text data; converting the plurality of words of the reference text data to into root words; and mapping the root words to the numerical vectors.

In any of the above, converting the plurality of words of the reference text data to into root words may include: formatting the plurality of words of the reference text data to eliminate data that does not contribute to the semantic meaning of the reference text words; separating the formatted plurality of words into tokens; normalizing the tokens into root words.

In any of the above, normalizing of the tokens into root words may include at least one of truncating affixes from the tokens and converting the tokens into a base form.

In some aspects, the present disclosure describes a system including a processing unit configured to execute instructions to cause the system to perform any of the methods described herein.

In some aspects, the present disclosure describes a computer-readable medium having instructions tangibly stored thereon. The instructions, when executed by a processing unit of a system, causes the system to perform any of the methods described herein.

BRIEF DESCRIPTION OF THE DRAWINGS

Reference will now be made, by way of example, to the accompanying drawings which show example embodiments of the present application, and in which:

FIG. 7 shows a table containing example vector distance determination methods;

FIG. 8 shows a table containing example clustering criterions; and

Similar reference numerals may have been used in different figures to denote similar components.

DESCRIPTION OF EXAMPLE EMBODIMENTS

To help in understanding examples discussed herein, an example processing system is first described. The processing system may be embodied as a workstation, a server, or other suitable computing system.

Figure 1:
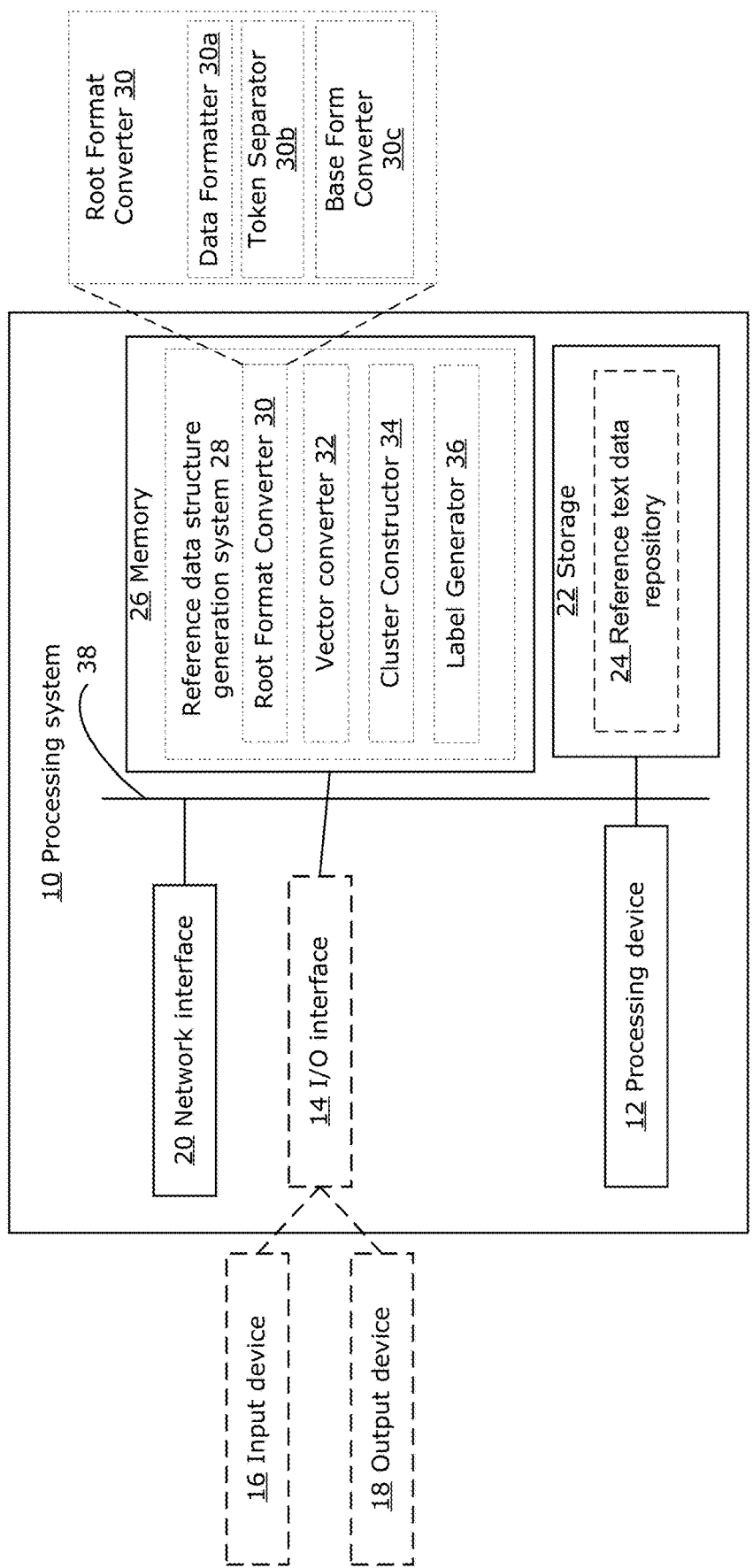
FIG. 1 shows a block diagram illustrating an example processing system that can be employed to implement the methods and system disclosed herein.

FIG. 1 is a simplified block diagram of an example processing system 10, which may be used to implement embodiments disclosed herein. Other processing systems may be suitable for implementing embodiments described in the present disclosure, and may include components different from those discussed below. Although FIG. 1 shows a single instance of each component, there may be multiple instances of each component in the processing system 10.

The processing system 10 may include one or more processing devices 12 (also called processing units), such as a processor, a microprocessor, a graphics processing unit (GPU), a tensor processing unit (TPU), an application-specific integrated circuit (ASIC), a field-programmable gate array (FPGA), a dedicated logic circuitry, or combinations thereof. The processing system 10 may optionally include one or more input/output (I/O) interfaces 14, to enable interfacing with one or more optional input devices 16 and/or output devices 18. The processing system 10 may include one or more network interfaces 20 for wired or wireless communication with a communication network (not shown) or peer-to-peer communication with other processing system. The network interface(s) 20 may include wired links (e.g., Ethernet cable) and/or wireless links (e.g., one or more antennas) for intra-network and/or inter-network communications.

The processing system 10 may also include one or more storage unit(s) 22, which may include a mass storage unit such as a solid state drive, a hard disk drive, a magnetic disk drive and/or an optical disk drive. In some example embodiments, the storage unit(s) 22 may include a reference text data repository 24 for storing reference input data as described in further detail below. Although FIG. 1 illustrates the storage unit(s) 22 including the reference text data repository 24, in alternative embodiments, the reference text data repository 24 may be included in one or more remote storage unit(s) that can be accessed remotely via wireless or wired communication network. Details of the reference text data will be discussed further below.

The processing system 10 may include one or more non-transitory memories 26, which may include a volatile or non-volatile memory (e.g., a flash memory, a random access memory (RAM), and/or a read-only memory (ROM)). The non-transitory memory(ies) 26 may store instructions for execution by the processing device(s) 12, such as to carry out example methods described in the present disclosure. The memory(ies) 26 may store other software (e.g., instructions for execution by the processing device(s) 12), such as an operating system and other applications/functions. In some embodiments, one or more data sets and/or modules may be provided by an external memory (e.g., an external drive in wired or wireless communication with the processing system 10) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. In an embodiment, memory(ies) 26 stores a reference data structure generation system 28, which is a software system that includes machine readable instructions that are stored in the memory(ies) 26 and are executable by the processing device 12. The reference data structure generation system 28 may include a root format converter 30, vector converter 32, a cluster constructor 34, and a label generator 36, which are software units (or software subsystems) of the system 28. The vector converter 32 may be machine-learning based software unit that implements a learned model which converts textual data into numerical vectors as described in further detail below. In other embodiments, the vector converter 32 may implement an algorithm which converts textual data into numerical vectors. In some embodiments, the system 28 may be implemented as a single hardware device, such as an application specific integrated circuit (ASIC), field programmable gate array (FPGA), or a system on a chip (SoC). The hardware device includes electronic circuits that perform the functions of the units 30, 32, 34, 36. In other example embodiments, the system 28 may be implemented as multiple hardware devices (e.g., multiple ASIC, FPGAs, and/or SoCs). Each hardware device includes electronic circuits that perform the functions of one of the units 30, 32, 34, 36. Details of the root format converter 30, vector converter 32, a cluster constructor 34, and a label generator 36 will be discussed further below. It should be understood that the units 30, 32, 34, 36 are not necessarily separate units of the system 28, and that the illustration of the 30, 32, 34, 36 as separate blocks within the system 28 may only be a conceptual representation of the overall operation of the system 28.

There may be a bus 38 providing communication among components of the processing system 10, including the processing device(s) 12, optional I/O interface(s) 14, network interface(s) 20, storage unit(s) 22 and/or memory(ies) 26. The bus 38 may be any suitable bus architecture including, for example, a memory bus, a peripheral bus or a video bus.

In FIG. 1, the optional input device(s) 16 (e.g., a keyboard, a mouse, a microphone, a touchscreen integrated into a display device which may include a UI and/or a keypad) and optional output device(s) 18 (e.g., a display device which may include a UI, a speaker and/or a printer) are shown as external to the processing system 10. In other examples, one or more of the input device(s) 16 and/or the output device(s) 18 may be an internal component of the processing system 10. Input device(s) 16 may include a display device having a display screen and a user interface (UI) navigation device (for example a touchscreen input, a mouse or a handheld controller) for allowing a user to interact with items displayed by the display device. The output device(s) 18 may also include a display device having a display screen and a user interface (UI) navigation device for displaying generated results of the methods disclosed herein.

Figure 2:
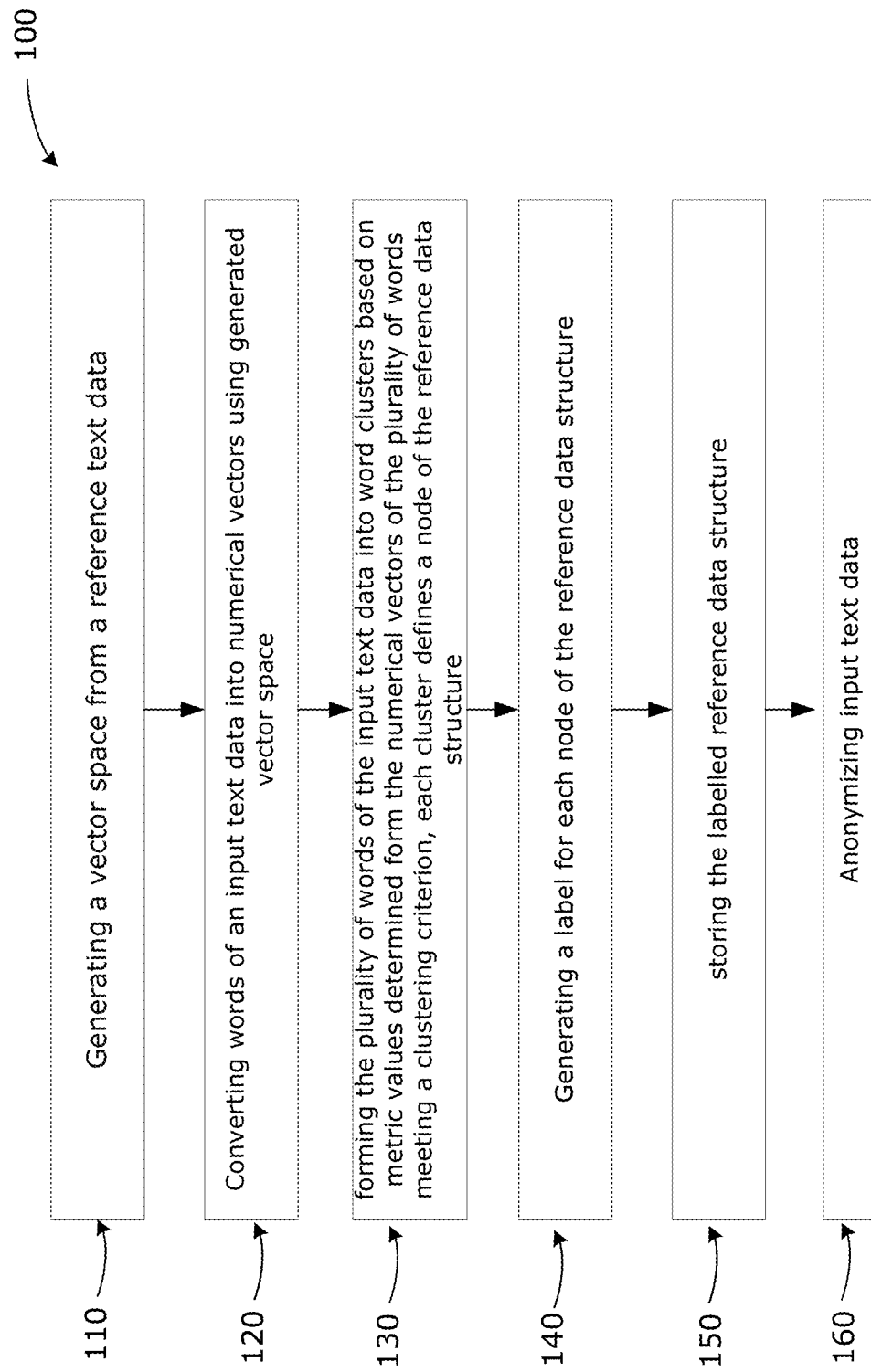
FIG. 2 shows a flowchart illustrating an example method for generating a reference data structure for anonymization of data in accordance with one aspect of the present disclosure.

FIG. 2 is a flowchart of an example method 100, which may be performed by the reference data structure generation system 28 of the present disclosure, for generating a reference data structure for anonymization of data. In particular, method 100 may be used to automatically generate a reference data structure for a K-anonymity model for text input data.

Figure 3:
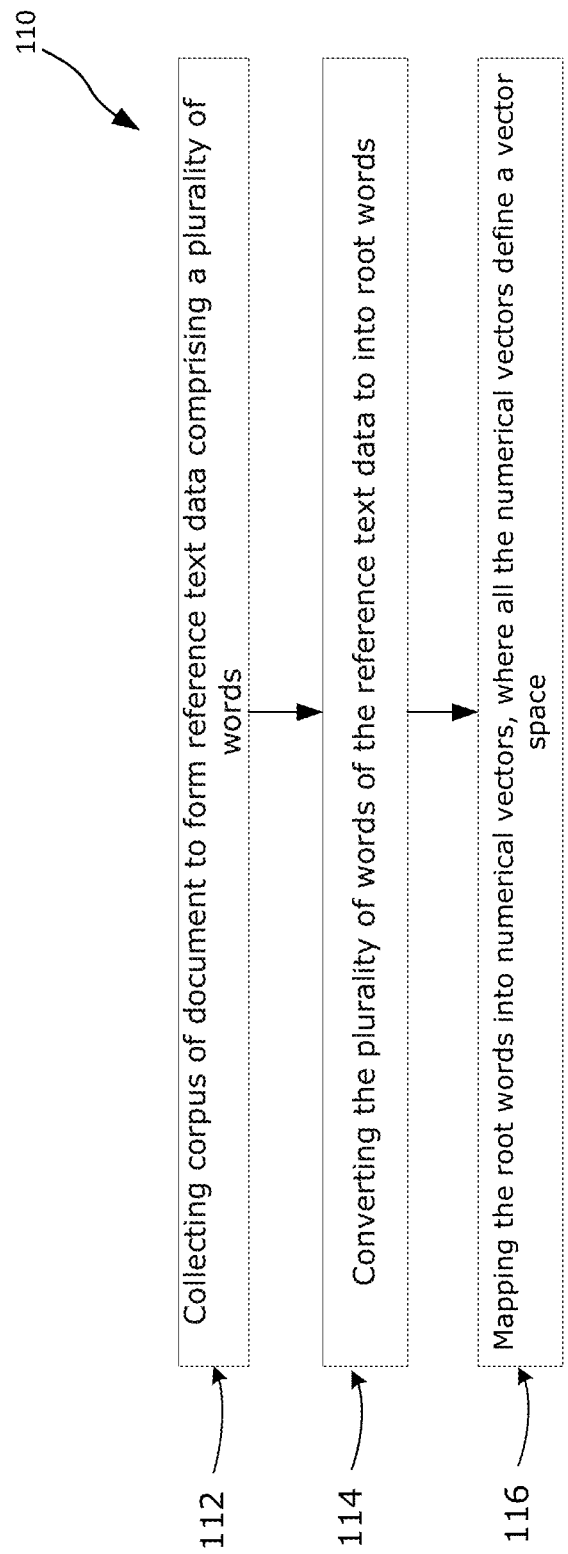
FIG. 3 shows a flowchart showing an example of the step 110 in FIG. 2.

At step 110, a vector space is generated from a reference text data that comprises a plurality of text words. FIG. 3 is a flowchart illustrating example steps that may be performed as part of performing step 110. Specifically, at step 112, a corpus of documents may be collected to form the reference text data. Typically, the reference text data may comprise of unstructured text that may contain punctuations, symbols, and upper/lower cases. In some embodiments, the reference text data may comprise words collected from diverse domains, which may provide a more comprehensive coverage of the lexical semantic meanings of words in a given language. The reference text data contain contextual information for each of the plurality of words. By way of a non-limiting example, for a given word of the reference text data, its surrounding words, or context words, may provide contextual information, such as the semantic meaning of the given word. Factors such as semantic consistency, vocabulary coverage, and currency of the reference text data may also affect the accuracy of the vector conversion step as discussed in more detail below.

In some embodiments, the reference text data may be collected from third party sources through network interface 20 or inputted through input device 16 via I/O interface 14. The collected reference text data may be stored within reference text data repository 24 of the one or more storage unit(s) 22 to be readily accessible by various system components through bus 38. It is to be appreciated that the reference text data may be obtained from one or more of the aforementioned methods, or any other suitable methods.

At the step 114, the root format converter 30 converts the plurality of words from the reference text data into root words.

Figure 4:
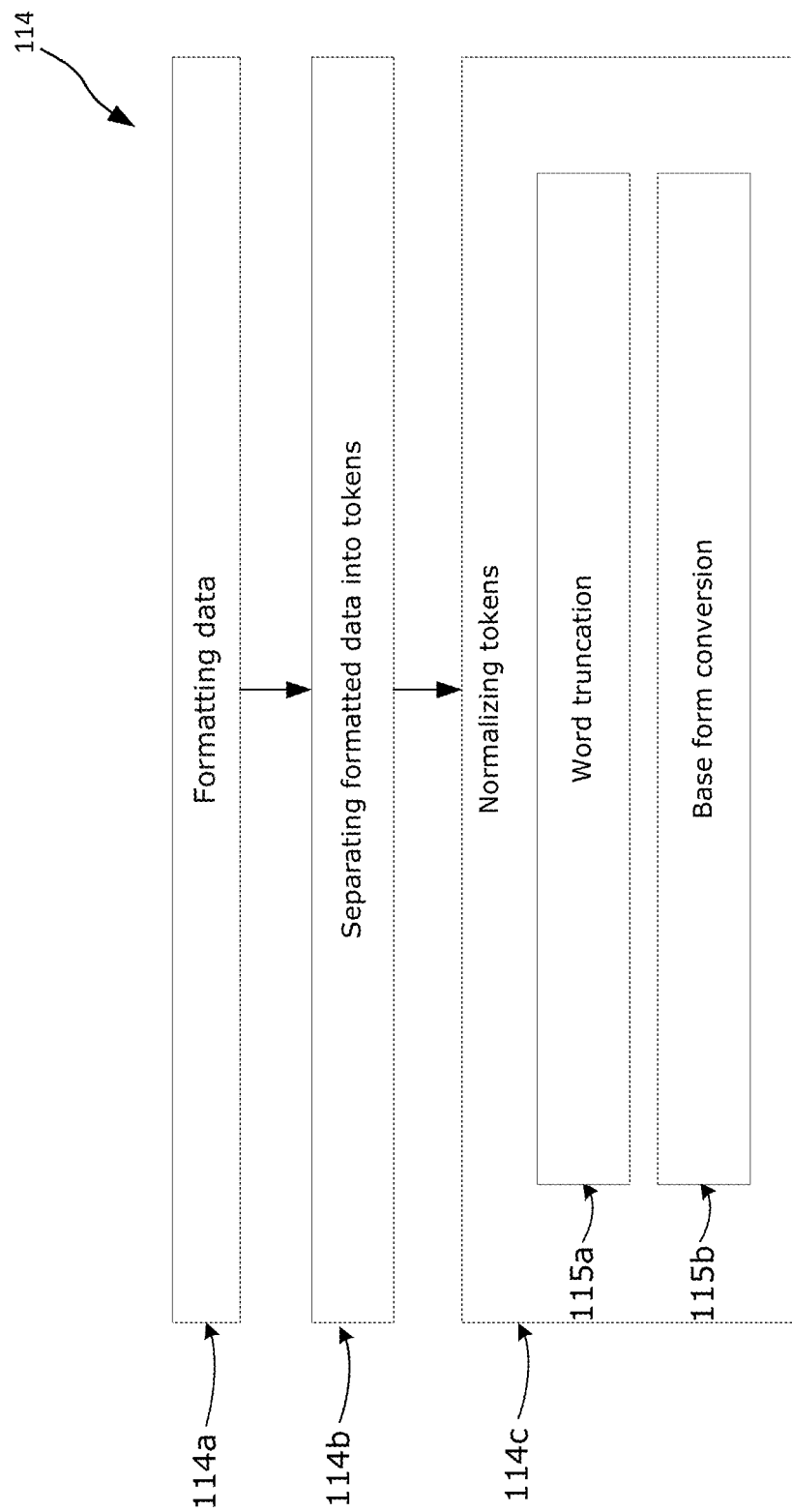
FIG. 4 shows a flowchart showing an example of the step 114 in FIG. 3.

FIG. 4 shows a flow chart illustrating example steps that may be performed as part of performing example step 114. In the illustrated embodiment, the conversion step 114 may further comprise the steps of formatting data 114a by the data formatter 30a, separating formatted data into tokens 114b by the token separator 30b, and converting the tokens into base forms by the base form converter 30c.

In the illustrated embodiment, at the formatting data step 114a, extraneous elements contained in the reference text data that may not contribute to the semantic meaning of a word or phrase are removed and formatting of the unstructured text is normalized. For example, the step 114a may include the removal of HTML tags and URL's, extra whitespaces, special characters (ex. "$" and "%"), and punctuations, as well as converting accented characters to unaccented characters (ex. "café" to "cafe"), expanding contractions (ex. "don't" to "do not"), lowercasing all texts, and/or converting number words to numeric form or removing numbers. The formatting data step 122 may also include removing stop words, which are generic or common words that contribute little to the semantic meaning of a word or phrase. For instance, words including "the" and "a" do not generally contribute greatly to the semantic meaning of text content. It is to be understood that other suitable steps may be implemented within the formatting data step 114a.

At the token separation step 114b, the formatted reference text data from step 114a is separated or segmented into smaller pieces, or "tokens", in accordance with a segmentation strategy. Various segmentation strategies for defining boundaries between tokens may be adopted. By way of non-limiting examples, segmentation boundaries may be defined as non-alphanumeric characters, whitespaces, and/or punctuations. In other embodiments, the segmentation boundary may be defined by changes in character entropy, which determines the conditional probabilities of all occurring transitions between characters to further determine both the number of probable next neighbors, and a reduction of probability past a threshold value given each consecutive character may serve as a boundary. In some other embodiments, a manually created token boundary definition list may be used. It is to be appreciated that other segmentation strategies to define token boundaries may be possible. The segmentation boundaries may be dependent on the language of the reference text data. For example, whitespaces may function as a suitable segmentation boundary for languages like English, however it may not be suitable for East Asian language where characters are written without spaces in between.

After token separation step 114b, the tokens may be normalized at step 114c to convert the separated tokens into a root format such that two tokens with superficial differences in the character sequence, or families of derivationally related words with similar meanings, such as "studying", "studies", "studied" may be matched the same root word such as "study".

The normalization step 114c may include the word truncation step 115a, where each token may be further truncated to eliminate affixes (e.g., suffixed, prefixes, infixes, circumfixes) in order to a truncated version of the token, or a "stem" as it is known in the art. In some embodiments, the word truncating step 115a, also referred to in the art as the "stemming", is implemented by the base form converter 30c with a heuristic process that simply removes the endings of words, and often includes the removal of derivational affixes. By way of an example, words "depression" and "depressed" may be converted to the word "depress" after by truncating the suffixes "ion" and "ed", respectively. Other possible algorithms that may be used for implementation of the word truncating step 115a include the Porter Stemmer, the Lancaster Stemmer, the one-pass Lovins stemmer, and the Paice/Husk stemmer, among others.

The token normalization step 114c may also include a base form conversion step 115b where each token that is an inflected or conjugated form of a word may be converted to a base form, or canonical forms, which is defined as the simplest form used for dictionary entry. This base form is also known as a "lemma". By way of an example, the word "better" may return its base form word of "good". Algorithms for step 115b typically rely on a rules-based approach where the base form conversion rules may be manually defined depending on the particular language, or the rules may be learned using machine learning methods. Existing base form conversion algorithms, or lemmatizers, include the NLTK Lemmatizer, Wordnet Lemmatizer, Spacy Lemmatizer, TextBlob, CLiPS Pattern, Stanford CoreNLP, Gensim Lemmatizer, and TreeTagger, among others, may be used to implement step 115b.

In some embodiments, the word truncation step 115a may require less computing resource and less execution time due to its relatively simplistic approach of truncating affixes of token words. However, the result may be less accurate in certain instances. For example, the word "better" after word truncation step 115a may yield "bett" which does not accurately reflect the lexical meaning of the original word. In contrast, the base form conversion step 115b may yield a more accurate normalized form of "good" for the word "better". However, the improved accuracy of step 115b may come at the expense of computing resources and execution time. Thus, it is to be appreciated that steps 115a and 115b may be used independently of, or in conjunction with, one another within normalization step 115 depending on computing resource limitations or execution time constraint for example.

After the token normalization step 115, the tokens from the reference text data are converted to root words, which are in turn mapped to numerical vectors at step 116 by the vector converter 32. The vector values for a word may be indicative of the semantic meaning of the word with other words. A metric value is a measure of vector proximity between two vectors, where the vector proximity represents semantic relationship between the words from which the numerical vectors are generated. The semantic relationship may be defined as the association that exists between the meanings of words, phrases, or sentences. For example, synonymous words with similar meaning may be said to be semantically similar, and vice versa, antonymous words with dissimilar meaning may be said to be semantically dissimilar. The numerical values of each vector are trained, as discussed in more detail, to reflect the semantic meaning of a given word based on the contextual information for the given word presented in the reference text data. The class of techniques of mapping words to real-value numerical vectors is also known as word embedding. Preferably, words with similar semantical meaning are represented with similar numerical vectors.

The numerical vectors are of dimensional size (n), and collectively, all of the numerical vectors together define a vector space. The dimensional size of each vector may impact the ability to capture the semantic meaning of the root words. If every word and every part of a speech were represented with a numerical value of a vector, a high-dimensional vector would be required for a vocabulary having a large number of words. The resulting vector that a given word may be mapped to would consist of mostly zeros, having only one non-zero entry (a value of one) at the index corresponding to that given word. This is an example of sparse representation, and is known as One-Hot Encoding. In some embodiments of the present disclosure, each numerical vector is a dense vector of n-dimension, where n is less than the dimension of its corresponding One-Hot Encoding dimension. The dense vector may comprise of floating-point values that may be indicative of the semantic meaning of a particular word. A higher dimensional size n may be capable of better capturing a word's semantic meaning at the cost of computational efficiency. Vice versa, a lower dimensional size n may offer computational efficiency but may not as effective in capturing the semantic meaning. The dimensional size n may be set as a parameter during training.

Various methods may be implemented by the vector converter 32 for mapping root words to numerical vectors at the step 116. In some embodiments, the step 116 may be performed by machine-learning methods.

In some embodiments, performance of the step 116 by the vector converter 32 may be achieved using the word2vec algorithm, which uses a shallow 2-layer neural network to map discrete objects (words) to n-dimensional real number feature vectors in a way that words with similar semantic meanings are similarly represented feature vectors. It is to be appreciated that other algorithms of mapping words to numerical vectors, such as the Global Vector (GloVe), doc2vec, among others, may be possible.

In the case of word2vec, rather than training against the input words through reconstruction, word2vec trains words against other words that neighbor them in the reference text data that provides contextual information on a target input word. The training models may be implemented in one of two ways, either a continuous bag of words, or CBOW model, or a skip-gram model. The Continuous Bag-of-Words (CBOW) model may be suitable for faster model training with better representation for the more frequently occurring words. The continuous skip-gram model may work well with a small amount of the training data with improved representation of rare words or phrases.

The CBOW model architecture tries to predict the current target word (the center word) from the source context words or surrounding words that provides contextual information on the target word. It is to be appreciated that the context size to be taking into consideration may vary. Specifically, the CBOW model aims to maximize equation (1) below, where wt is the word to be predicted from the surrounding context words wt−1, wt−2, . . . , wt−c, and wt+1, wt+2, . . . , wt+c that provides contextual information on the target word wt. The variable |V| denotes the total number of roots words in the reference text data, and c is the context size. By way of an example, for a c value of 4, 4 words before the target word wt, and 4 words after are taken into consideration.

$$\frac{1}{|V|}\sum_{t=1}^{|V|}\log\left[p\left(wt \mid \begin{array}{c} wt-c, \ldots, wt-2, wt-1, \\ wt+1, wt+2, \ldots, wt+c \end{array}\right)\right] \quad \text{Equation (1)}$$

The CBOW model uses context words as the inputs and they are passed to an embedding layer in the form of a weight matrix initialized with random weight values. The embedding layer generates feature vectors for the context words that are propagated to a lambda layer where they are summed and averaged into a single average context vector. This average context vector may then be passed to a dense softmax layer to makes a prediction on the target word. The softmax layer essentially implements a softmax function, which takes as input a vector of K real numbers, and normalizes it into a probability distribution consisting of K probabilities proportional to the exponentials of the input numbers. The prediction is then compared with the actual target word t to compute the loss or error, which is back-propagated to update the weight values of the embedding layer.

Alternatively, the skip-gram model tries to achieve the reverse of what the CBOW model does by attempting to predict the context words (surrounding words) given a target word. The skip-gram model aims to maximize equation (2) below, where |V| is the total number of roots words in the reference text data, and c is the context size.

$$\frac{1}{|V|}\sum_{t=1}^{|V|}\sum_{j=t-c, j\neq t}^{t+c}\log[p(wj \mid wt)] \quad \text{Equation (2)}$$

In some embodiments, the task of predicting context words using the skip-gram model may be simplified to word pairs consisting of the target word and a context word. The word pair along with a relevance indicator are the inputs to a skip-gram model. The relevance indicator indicates the relevance between the target word and the context word. For example, a context indicator value of "1" indicates a semantically similar pair, a value of "0" indicates semantic dissimilarity between the two words. Each word pair, along with the relevance indicator, are passed to a corresponding embedding layer, in the form of a weight matrix initialized with random weight values. The embedding layer then generates numerical feature vectors for the target word and the context word, which are then passed to a merge layer where the dot product of these two vectors are determined. This dot product value is then passed to a dense sigmoid layer which predicts either a 1 or a 0 depending on if the two words are contextually relevant or just random words. The relevance prediction is compared against the actual relevance indicator value to compute the loss or error, which is back-propagated to update the weight values of the embedding layer.

Upon completion, the embedding layer with updated weight values in the form of an embedding weight matrix may be used for numerical vector conversion. In some embodiments, the root words are stored with a corresponding row identifier, where the row identifier identifies a row of the embedding weight matrix where the column values, or the updated weight values, are the numerical values of its corresponding numerical vector.

In some embodiments of the present disclosure, an extension of the continuous Skip-Gram model, with sub-sampling of frequently occurring words during training may be adopted. In some further embodiments, step 116 may also adopt Noise Contrastive Estimation for training the Skip-Gram model, which may result in faster training and more accurate vector representation.

In some embodiments, the Term Frequency (TF) and Inverse Document Frequency (IDF) (TF-IDF) weighting algorithm may be adopted, in which the IDF factor functions to eliminate or minimize effects of the commonly used words such as propositions to allow the TF factor to more accurately represent eh subject of the document at hand.

It is to be appreciated that the training process can be applied multiple times, by returning to step 112 to obtain additional reference text data.

In some embodiments, step 116 may further include sub-steps such as dimensional reduction to further enhance the performance of the method 100, to obtain more accurate representation of the root words. Specifically, as mentioned above, analysis of high dimensional vectors may be time-consuming and computing resource intensive. Thus, it may be desirable to reduce the dimensionality of the vectors while retaining as much meaningful information as possible. Additional advantages of dimensionality reduction may include less space required for data storage and less computation/training time. Further, with reduced dimensions, it may be easier to visualize or display data in a graphical manner. One of the possible dimension reduction algorithm is the t-Distributed Stochastic Neighbor Embedding (t-SNE) algorithm. The t-SNE algorithm first constructs a probability distribution over pairs of high-dimensional objects such as the numerical vectors in such a way that similar objects have a high probability of being picked while dissimilar points have an extremely small probability of being picked. Then, the t-SNE algorithm defines a similar probability distribution over the points in the low-dimensional map, and it minimizes the Kullback-Leibler divergence (KL divergence) between the two distributions with respect to the locations of the points. Some other suitable dimensionality reduction algorithms may include Latent Semantic Analysis (LSA), and Uniform Manifold Approximation and Projection (UMAP), among others.

Other sub-steps to step 116 may include analogical reasoning (or evaluating embedding).

Referring back to FIG. 2, at step 120, an input text data comprising of plurality of words are converted into numerical vectors using the vector space generated from the reference text data. Specifically, an input text data comprising of plurality of words is received by the reference data structure generation system 28. The input text data may be in a structured data format such as a table or a dataset with multiple columns, one or more of which contain data values to be anonymized. Each column that needs to be anonymized may consists of multiple rows.

One or more of the plurality of words that are to be anonymized from the input text data are converted to numerical vectors based on the vector space derived from step 110. The words to be anonymized from the input text data are first converted to root words prior to numerical vector conversion. In some embodiments, the words from the input text data may be converted to root words using the same step 114, i.e. using identical same steps 114a to 114c as shown in FIG. 4, such that same words from the input text data may be converted to the identical roots words as those of the reference text data used to generate the vector space. Accordingly, the numerical vector for a given input text data root word may be obtained by looking up the root word in the embedding weight matrix through a search. By way of a non-limiting example, the word "better" from the reference text data may have been converted to the root word "good", which may then be subsequently mapped to a corresponding numerical vector such as [0.1, 0.23, 0.45, 0.78, 0.05] for example which may be row 50 in the embedding weight matrix. The root word "good" may be stored with a row identifier of 50. Then, by applying identical step 120 to the input text data, any occurrence of word "better" within the input text data may also be converted to the root word of "good". The vector converter 32 may then simply look up the entry for root word "good" and retrieve the row identifier stored along with the root word. Using the row identifier, i.e. 50, the numerical vector for the root word "good" may be retrieved from row 50 of the embedding weight matrix and used to convert the word "better" from the input text data to its corresponding numerical vector of [0.1, 0.23, 0.45, 0.78, 0.05]. In some embodiments, the input text data may contain words or phrases that was not encountered in the reference text data, or out of vocabulary words. In such cases, a search of the root word for the out of vocabulary word may not return a corresponding numerical vector form the embedding weight matrix. There are a number of suitable methods for handling an out of vocabulary word, including returning a zero vector, or generate a corresponding vector using sub-word information such as character n-grams.

Once the root words of the input text data have been converted to numerical vectors, the root words from the input text data are iteratively and hierarchically formed into word clusters by the cluster constructor 34 at step 130. Specifically, word clusters are formed based on the metric value from the representative vectors satisfying a similarity condition set by the clustering criterion, where each word cluster defines a node of the reference data structure. The representative vectors may depend on the clustering criterion. The word cluster formation may be implemented with a "bottom-up" approach, or an agglomerative clustering approach, where each word of the input text data starts in its own word cluster, and are iteratively merged together in a hierarchically manner until a single cluster emerges. Alternatively, the grouping may be implemented with a "top-down" approach, or a divisive clustering approach, where all root words of the input text data start as a single word cluster, and are recursively split into smaller word clusters until, for example, each word cluster comprises of at least K root words as may be required by a K-anonymity model.

Figure 5:
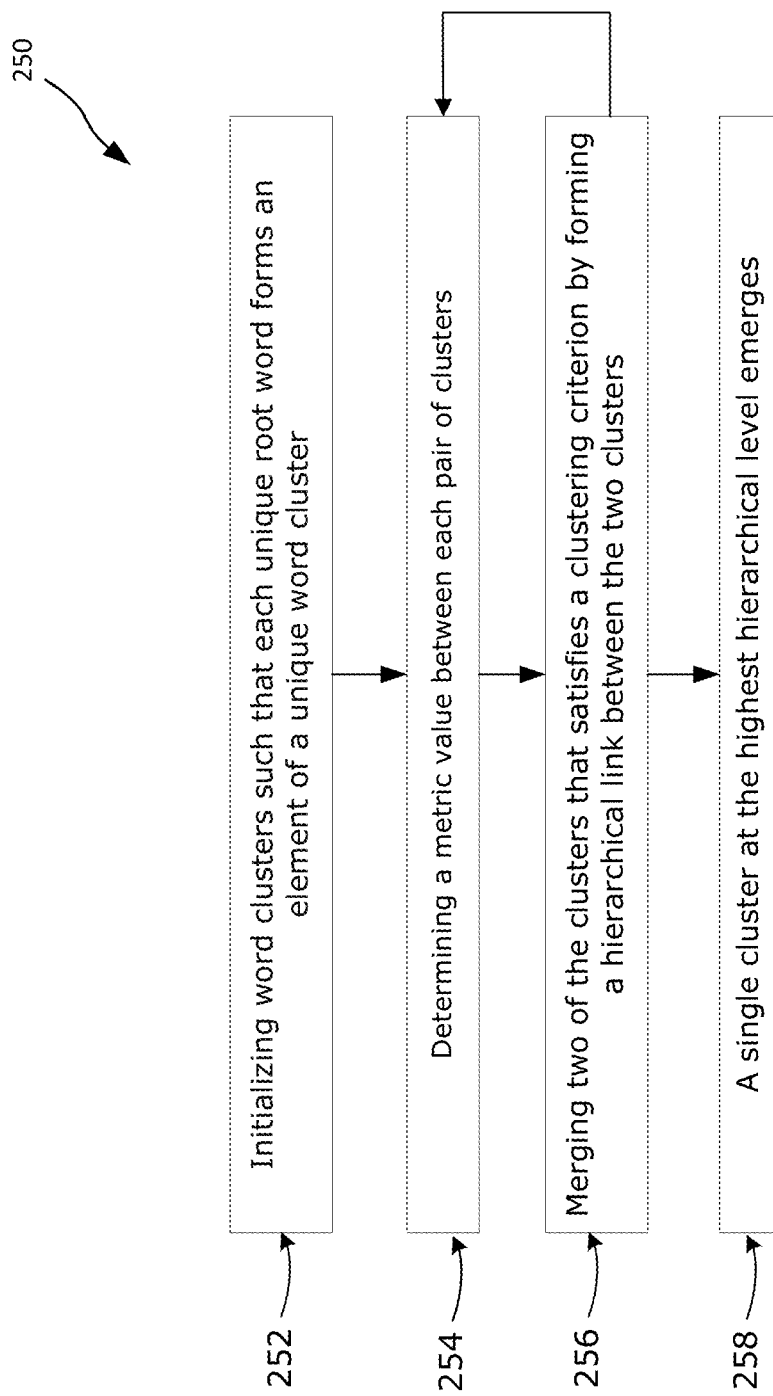
FIG. 5 shows a flowchart for an agglomerative approach that may be implemented at step 130 in FIG. 2.

FIG. 5 shows a flowchart for an agglomerative approach 250 to grouping that may be implemented at step 130.

During step 252, N word clusters are initialized such that each of the N root words of the input text data form an element of a unique word cluster.

At step 254, a metric value between numerical vectors of two of the N word clusters are determined as described in more detail below. The metric value may be representative of the semantic similarity between the two word clusters.

At step 256, two of the N word clusters may be deemed closest to one another when the metric value of representative vectors of the two clusters satisfies a clustering criterion. The representative vectors may be dictated by the clustering criterion. Accordingly, the two closest word clusters are merged to form a new word cluster.

The steps 254 and 256 are iteratively repeated until a single word cluster emerges at the top of the reference data structure at step 258.

Figure 6:
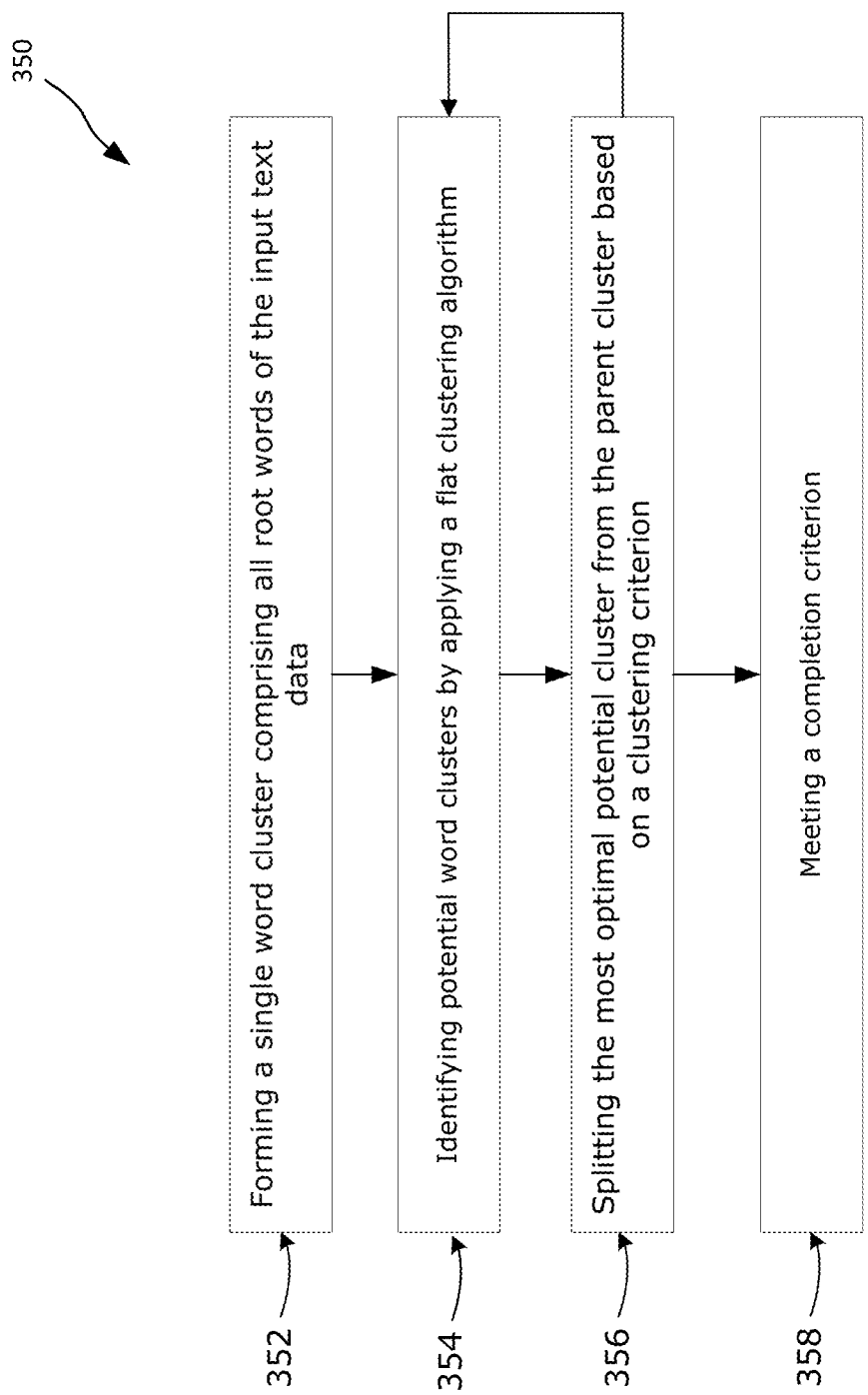
FIG. 6 shows a flowchart for a divisive approach that may be implemented at step 130 in FIG. 2.

FIG. 6 shows a flowchart for a divisive clustering approach 350 to forming word clusters that may be implemented at step 130. At step 352, all of the root words of the input text data are initialized to form a single word cluster. At step 354, a flat clustering algorithm may be applied to identify potential word clusters. By way of a non-limiting example, a K-means flat clustering algorithm may be implemented, where K is the number of desired clusters. The K-means flat clustering algorithm aims to minimize a metric value, such as the average squared difference, between data points and its assigned centroid. The algorithm begins by randomly assigning K centroids to the parent cluster. Assign data points, or in this case, root words, that are closest to the centroid in terms of vector distance to each centroid. Then, re-compute each centroid as the average of the vectors that were assigned to it in reassignment. The process is iteratively repeated until a stopping condition is met. Upon completion of the step 354, K centroids for K potential clusters would be identified. At step 356, an optimal potential word cluster out of the K potential clusters is selected based on a clustering criterion and split away from the parent cluster, such as by forming a link between the newly formed cluster and the parent cluster. Each word cluster defines a node in the reference data structure. Steps 354 and 356 are iteratively repeated until a completion criterion, such as each cluster only comprises a single element, or a number of desired clusters, has been achieved at 358.

In some embodiments, the divisive clustering approach 350, may be more complex relative to the agglomerative clustering approach 250, as divisive clustering approach 350 requires a flat clustering method. However, divisive clustering may be more efficient in cases where an incomplete reference data structure which does not extend all the way down to individual data leaves. Time complexity of a agglomerative clustering is $O(n^3)$ in big-o notation, which may be reduced down to $O(n^2)$ with optimization. Whereas for divisive clustering approach is linear in the number of patterns and clusters. Further, divisive clustering approach may also be more accurate at least because agglomerative clustering makes decisions by considering the local patterns or neighbor points without initially taking into account the global distribution of data. In contrast, divisive clustering approach takes into consideration the global distribution of data when making top-level partitioning decisions.

As mentioned above, the metric value used for the step 130 is indicative of the vector proximity, which is representative of semantic similarities between words. A number of metric values may be suitable as an indicator of numeric vector proximity, and in turn semantical similarities between word clusters.

FIG. 7 shows a table 700 containing some of the metric values that may be used for step 130.

The metric values include the Euclidean distance 702a, which calculates a straight line distance between two points in Euclidean space. By way of an illustrative example, for vectors a and b of dimension size i, the distance between these two points may be determined with formula 702b as follows:

$$\sqrt{(a_1-b_1)^2+((a_2-b_2)^2+(a_3-b_3)^2+...+(a_i-i)^2}$$

The squared Euclidean distance 704a, another one of the metric values that may be used in step 130, is determined using equation 704b which is similar to 702b of the Euclidean distance, but does not take the square root. As a result, clustering with the Euclidean Squared distance based metric may be faster than clustering with the regular Euclidean distance.

Possible metric values may also include the Manhattan distance 706a, so named after the grid-like layout of most streets on the island of Manhattan, may be analogous to computing the distance that would be traveled to get from one data point to the other if a grid-like path is followed. The Manhattan distance between two items is the sum of the differences of their corresponding components as shown in formula 706b.

Another possible metric value that may be used in step 130 is the maximum distance 708a, which determines the distance between two vectors as the greatest of their differences along any coordinate dimension with formula 708b.

A further possible metric value that may be used in step 130 includes the Mahalanobis distance 710a, which calculates the distance between two points in multivariate space. In a regular Euclidean space, variables (e.g. x, y, z) are represented by axes drawn at right angles to each other. However, if two or more variables are correlated, the axes are no longer at right angles. The Mahalanobis distance as determined with formula 710b measures distances between points, even for correlated points with multiple variables.

It is to be appreciated that other suitable metric values, such as the Hamming distance or the Levenshtein distance, may also be used for step 130.

Once the metric value is determined, a clustering criterion is used to determine the formation of a particular word cluster based on the metric values determined at step 254, 354. More specifically, the criterion determines the similarity between word clusters as a function of the pairwise metrics between them. For example, at each step, the two clusters separated by the shortest Euclidean vector distance, or any other metric value, are combined into a single word cluster. The definition of 'shortest distance' is what differentiates between the different agglomerative clustering methods.

FIG. 8 contains a table 800 listing various clustering criteria anyone of which, among others, may be suitable for implementation at step 256. The clustering criterion is representative of a semantic similarity condition for merging word clusters based on the metric value of vectors representative of the word clusters in question as discussed in more detail below respect to each of the criterion.

The criterion 802a is the maximum or complete linkage clustering criterion. In complete-linkage clustering, each element of one word cluster is linked to a corresponding element from another word cluster thereby forming multiple element pairs. The vector distance between the two word clusters is defined to equal to the distance between representative vectors, which are the vectors of the element pair farthest away from each other, or having the longest link. During each clustering iteration, the two clusters with the shortest link are merged into a single word cluster. In formula 802b, the vector distance between clusters A and B is defined as the maximum of the vector distances between element pairs a and b, where a and b are elements of clusters A and B, respectively. The vector distance formula d may be any one of the metric values shown in FIG. 7 or other suitable methods of vector distance determination methods.

Criterion 804a is the minimum or single linkage clustering criterion, which merges a cluster with its nearest neighboring cluster. Criterion 804a may be capable of generating a minimum spanning hierarchy tree. Also referred to as the single linkage clustering criterion, this criterion groups a cluster with another at a given similarity (or distance) level may only require that one cluster of each of the two clusters about to agglomerate be linked to one another at this level. In formula 804b, the vector distance between clusters A and B is defined as the minimum of the vector distances between vectors of element pairs a and b, the representative vectors, where a and b are elements of clusters A and B, respectively. The vector distance formula d may be any one of the formulae shown in FIG. 7 or other suitable methods of vector distance determination methods.

A further criterion is the unweighted average linkage clustering 806a, also known as the group average sorting or Unweighted Pair-Group Method using Arithmetic averages (UPGMA). This criterion gives equal weights to the original similarities, it assumes that the elements in each group form a representative sample of the corresponding larger groups of objects in the reference population. For this reason, UPGMA clustering criterion 806a may be well suited for simple random or systematic sampling designs if the results are to be extrapolated to a larger reference population. UPGMA criterion 806a may allow an object to join a group or cluster at the average of the distances between this object and all members of the group. Two clusters are merged together at the average of the distances between all members of one group and all members of the other. In formula 806b, the average of all distances as determined with distance formula d between pairs of objects x in cluster A and y in cluster B is averaged by the cluster sizes |A| and |B|.

The weighted average linkage clustering criterion 808a, may be used in cases where groups of elements representing different situations (and thus likely to form different groups) are represented by unequal numbers of elements. In such cases, the unweighted UPGMA criterion 806a above may be distorted when a fusion of a large and a small cluster occurs. In formula 808b, at each merging iteration, the nearest two clusters, say i and j, are combined into a higher-level cluster i∪j. Then, its distance to another cluster k is defined as the arithmetic mean of the average distances between all members of k and i, and k and j as determined with distance formula d. Accordingly, all vectors of all members of clusters i and j are the representative vectors.

The centroid linkage clustering criterion 810a, also known as the unweighted centroid clustering criterion (UPGMC) is yet another criterion that may be adopted. In a cluster of elements, the centroid, as the representative vector for the cluster, is the point that has the average coordinates of all the objects of the cluster. The UPGMC 810a, as shown in formula 810b, determines the distance between their centroids $C_s$ and $C_t$, and merge the two clusters if the centroid distance value is the smallest amongst all cluster pairs. Methods of determining the centroid of a cluster of objects are well known in the art.

It is to be appreciated that although a number of clustering criteria are listed in table 800, other suitable clustering criterion such as the sum of all intra-cluster variance; the increase in variance for the cluster being merged (Ward's criterion); the probability that candidate clusters spawn from the same distribution function (V-linkage); the product of in-degree and out-degree on a k-nearest-neighbor graph (graph degree linkage); and the increment of some cluster descriptor (i.e., a quantity defined for measuring the quality of a cluster) after merging two cluster may also be used.

Figure 9:
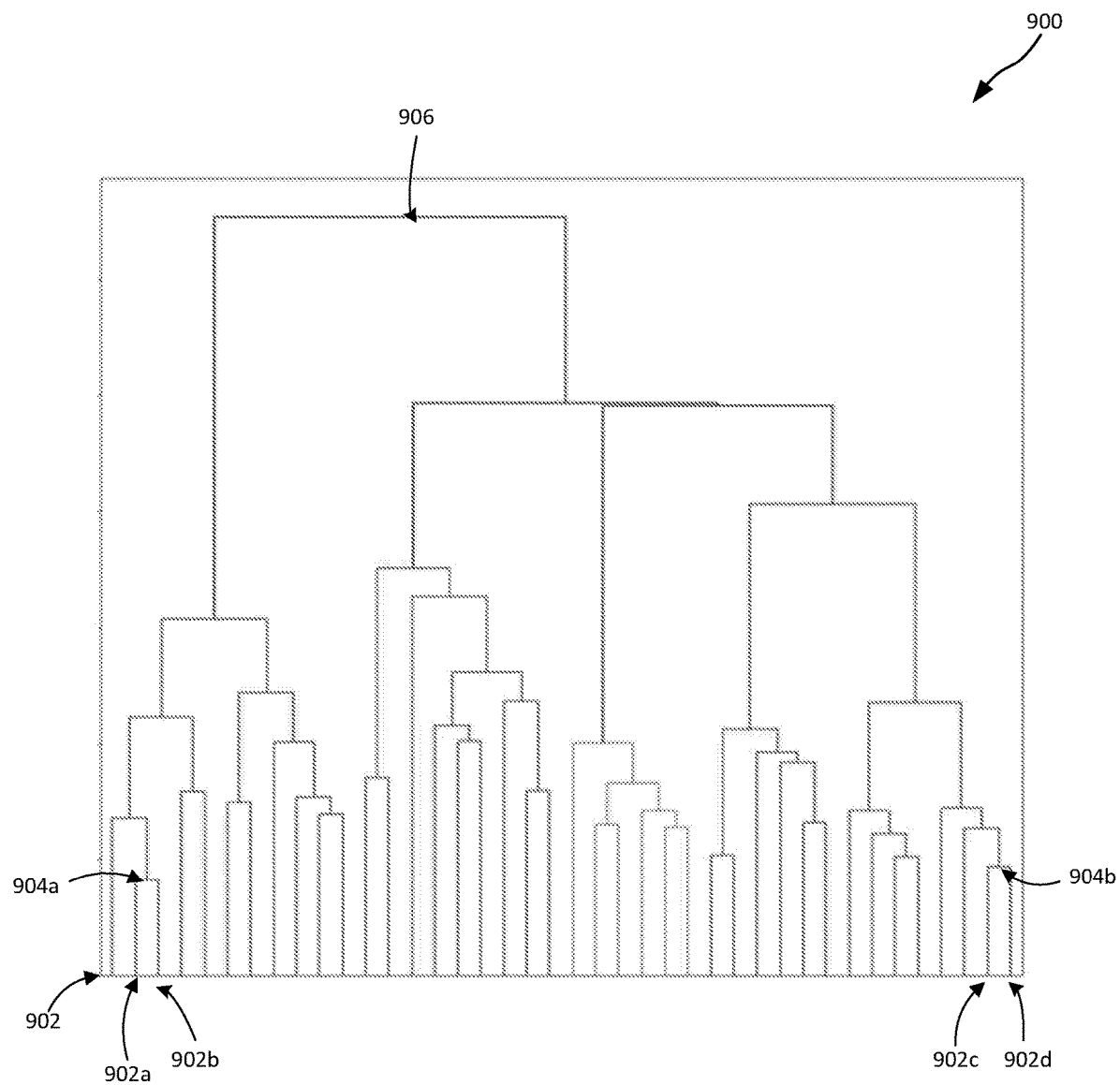
FIG. 9 shows a dendrogram of an unlabeled reference data structure in accordance with the present disclosure in the form of a binary tree.

An unlabeled reference data structure is generated upon completion of step 130. FIG. 9 shows a dendrogram of an example unlabeled reference data structure 900 in the form of a binary tree that may be generated following step 250 by using Euclidean distance 702a and minimum or single-linkage clustering criterion 804a. A plurality of word clusters 902, each comprising one of the root words of the input text data, form the leaf nodes of the binary tree at the lowest hierarchical level.

A Euclidean vector distance, as the metric value, is determined for each pair of word clusters. Word clusters 902a and 902b, each comprising a single word that is representative of their respective cluster, are determined to have the minimum Euclidean distance, as evidenced by the lowest link forming height on the dendrogram. The minimum Euclidean distance is indicative of word clusters 902a and 902b are most semantically similar out of all the word clusters. Consequently, word clusters 902a and 902b are merged into word cluster 904a in accordance with the single-linkage clustering criterion. On the next iteration of method steps 254, 256, word clusters 902c and 902d are determined to have the minimum Euclidean distance, and are merged into word cluster 904b in accordance with the single-linkage clustering criterion. The iterations are repeated until a single word cluster 906 emerges.

As mentioned above, the reference data structure generated from step 130 is unlabeled. At step 140, a label is generated for each word cluster by the label generator 36. In some embodiments, the labels are text labels that are representative of the similarity in semantic meaning shared by the members of each word cluster.

In some embodiments, an external database such as WordNet, a large lexical database that can generate hyponyms of words in the English language, may be utilized to generate a text label for each of the word clusters. A number of WordNet-based word similarity algorithms are implemented in a Perl package called WordNet::Similarity, and in a Python package called NLTK. Other more sophisticated WordNet-based similarity techniques include ADW, whose implementation is available in Java. By incorporating one of the WordNet-based programming packages, the root words of a given word cluster may be used to generate a lowest common hyponym of the root words. The hyponym may be used as the text label for the word cluster. By way of an example, root words "cat" and "tiger" may generate a hyponym of "feline", which may be used as the text label for the word cluster comprising "cat" and "tiger". The text label of a word cluster may then be used to represent the word cluster when it is merged into a new word cluster, to generate the text label for the new word cluster. Step 160 continues until all word clusters are labelled.

In some embodiments of the present disclosure, generation of a reference data structure for text input data in a second language other than English may be supported. By way of a non-limiting example, input text data in a second language is used to generate a reference data structure using the same method 100. Upon completion of step 130, the root words in the second language may be converted into English by a suitable translator, such an automatic translation algorithm or by manual means. The translated English input text data root words may then be used to generate hyponyms, which may in turn be translated back to the second language to be used as a text label for a word clusters. It may be appreciated that in some embodiments, the translation may be performed by external sources that are capable of providing hyponyms of words in the second language, such as an equivalent of WordNet.

At step 150, the labelled reference data structure may be stored either locally in a computer readable medium, such as data storage 22 or remotely such as at an off-site server or a cloud database through network interface 20.

At step 160, the labelled reference data structure may be used to anonymize the original input text data. As mentioned above, the input text data is typically in the form of structured data, such as a table, where the data to be anonymized are the row values of certain columns of the table. In order to achieve K-anonymization, the row values to be anonymized are each replaced with the word cluster labels from the reference data structure such that at least K row values are indistinguishable from one another. In some embodiments, for a given row value to be anonymized, the generated reference data structure is traversed based on the row value to locate a corresponding word cluster containing at least K root words. The text label of the located word cluster may then be used to substitute the row value. Step 180 would continue until all values to be anonymized are replaced with word cluster labels such that each value is indistinguishable from at least K other values.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published papers identified in this disclosure, are incorporated herein by reference.

The invention claimed is:

1. A method for generating a reference data structure for input text data comprising a plurality of input text words, the method comprising:
   generating a vector space from reference text data comprising a plurality of reference text words, wherein the vector space is defined by numerical vectors representative of semantic meanings of the reference text words, wherein there is a unique numerical vector representing each root word of the reference text words;
   converting the plurality of input text words into respective numerical vectors using the vector space, wherein each input text word is converted into a single respective numerical vector using the vector space;
   forming the plurality of input text words into word clusters according to semantic similarity between the input text words, the word clusters defining respective nodes of the reference data structure, the semantic similarity between pairs of input text words being represented by respective metric values determined from respective pairs of numerical vectors, the metric values being used to determine whether a clustering criterion is satisfied;
   wherein the reference data structure is a hierarchical data structure, having leaf nodes at a lowest hierarchical level, wherein a leaf node is defined by a word cluster represented by a root word, and wherein two semantically similar leaf nodes are child nodes of a common parent node;
   applying, to each respective node of the reference data structure, a respective text label, the respective text label being representative of the semantic meaning shared by elements of the word cluster defining the respective node, the respective text label being a lowest common hyponym of the root words of the elements of the word cluster; and
   storing the reference data structure.

2. The method of claim 1, further comprising, for each given word of the input text data, replacing the given word with the text label of the word cluster to which the given word belongs.

3. The method of claim 1, wherein the metric value is one of Euclidean distance, squared Euclidean distance, Manhattan distance, maximum distance, and Mahalanobis distance.

4. The method of claim 1, wherein the forming the plurality of words of the input text data into word clusters further comprises:
   initializing the word clusters such that each root word of a plurality of root words converted from the plurality of words of the input text data forms an element of each of the word clusters, each initialized word cluster defining a respective leaf node of the reference data structure;
   iteratively forming the word clusters, each iteration comprising:
      determining a metric value between each pair of word clusters based on the numerical vectors of each of the pair of word clusters; and
      merging two of the word clusters into a single merged word cluster when the metric value determined from the two word clusters satisfies a clustering criterion, the single merged word cluster defining a parent node of two child nodes defined by the two word clusters.

5. The method of claim 1, wherein the forming the plurality of words of the input text data into word clusters further comprises:
   initializing a single word cluster comprising all root words generated from the plurality of words of the input text data, the single word cluster is defined as a parent cluster, the initialized single word cluster defining a parent node at a highest hierarchical level of the reference data structure;
   iteratively forming the word clusters, each iteration comprising:
      identifying potential word clusters from the parent cluster by applying a flat clustering algorithm; and
      splitting one of the potential word clusters from the parent cluster to form a new word cluster, the new word cluster defining a child node of a parent node defined by the parent cluster.

6. The method of claim 1, wherein the clustering criterion is one of maximum linkage clustering, minimum clustering, unweight average linkage clustering, weighted average linkage clustering, minimum energy clustering, sum of all intra-cluster variance, Ward's criterion, V-linkage, graph degree linkage, and the increment of some cluster descriptor.

7. The method of claim 1, wherein the text label is a common hyponym of the elements of the word cluster.

8. The method of claim 7, wherein the input text data is in a first language, the method further comprises:
   translating words in the input text data from the first language into a second language;
   determining the common hyponym in the second language using the translated words in the second language; and
   translating the common hyponym in the second language into a translated term in the first language, and the translated term in the first language is used to as the text label for the word cluster.

9. The method of claim 1, wherein the generating of the vector space further comprises:
   collecting a corpus of documents to form the reference text data;
   converting the plurality of words of the reference text data to into the root words; and
   uniquely mapping the root words to the numerical vectors.

10. The method of claim 9, wherein the converting the plurality of words of the reference text data to into root words further comprises:
    formatting the plurality of words of the reference text data to eliminate data that does not contribute to the semantic meaning of the reference text words;
    separating the formatted plurality of words into tokens;
    normalizing the tokens into root words.

11. The method of claim 10, wherein the normalizing of the tokens into root words further comprises at least one of truncating affixes from the tokens and converting the tokens into a base form.

12. A system comprising a processing unit and a memory storing instructions which, when executed by the processing unit cause the system to:
    generate a vector space from reference text data comprising a plurality of reference text words, wherein the vector space is defined by numerical vectors representative of semantic meanings of the reference text words, wherein there is a unique numerical vector representing each root word of the reference text words;
    convert a plurality of input text words into respective numerical vectors using the vector space, wherein each input text word is converted into a single respective numerical vector using the vector space;
    form the plurality of input text words into word clusters according to semantic similarity between the input text words, the word clusters defining respective nodes of a reference data structure, the semantic similarity between pairs of input text words being represented by respective metric values determined from respective pairs of numerical vectors, the metric values being used to determine whether a clustering criterion is satisfied;
    wherein the reference data structure is a hierarchical data structure, having leaf nodes at a lowest hierarchical level, wherein a leaf node is defined by a word cluster represented by a root word, and wherein two semantically similar leaf nodes are child nodes of a common parent node;
    apply, to each respective node of the reference data structure, a respective text label, the respective text label being representative of the semantic meaning shared by elements of the word cluster defining the respective node, the respective text label being a lowest common hyponym of the root words of the elements of the word cluster; and
    store the reference data structure in the memory.

13. The system of claim 12, wherein the instructions, when executed by the processing unit, further cause the system to, for each given word of the input text, replace the given word with the text label of the word cluster to which the given word belongs.

14. The system of claim 12, wherein the instructions, when executed by the processing unit, further cause the system to:
    initialize the word clusters such that each root word of a plurality of root words converted from the plurality of words of the input text data forms an element of each of the word clusters, each initialized word cluster defining a respective leaf node of the reference data structure;
    iteratively form the word clusters, each iteration comprising:
      determining a metric value between each pair of word clusters based on the numerical vectors of each of the pair of word clusters; and
      merging two of the word clusters into a single word cluster when the metric value determined from the two word clusters satisfies a clustering criterion, the single merged word cluster defining a parent node of two child nodes defined by the two word clusters.

15. The system of claim 12, wherein the instructions, when executed by the processing unit, further cause the system to:
    initialize a single word cluster comprising all root words generated from the plurality of words of the input text data, the single word cluster is defined as a parent cluster, the initialized single word cluster defining a parent node at a highest hierarchical level of the reference data structure;
    iteratively form the word clusters, each iteration comprising:
      identifying potential word clusters from the parent cluster by applying a flat clustering algorithm; and
      splitting one of the potential word clusters from the parent cluster to form a new word cluster, the new word cluster defining a child node of a parent node defined by the parent cluster.

16. The system of claim 12, wherein the text label is a common hyponym of the elements of the word cluster.

17. The system of claim 16, wherein the input text data is in a first language, and the instructions, when executed by the processing unit, further cause the system to:
    translate words in the input text data from the first language into a second language;
    determine the common hyponym in the second language using the translated words in the second language; and
    translate the common hyponym in the second language into a translated term in the first language, and the translated term in the first language is used to as the text label for the word cluster.

18. The system of claim 12, wherein the instructions, when executed by the processing unit in the generating of the vector space, further cause the system to:
    collect a corpus of documents to form the reference text data;
    convert the plurality of words of the reference text data to into the root words; and
    uniquely map the root words to the numerical vectors.

19. The system of claim 12, wherein the instructions, when executed by the processing unit in converting the plurality of words of the reference text data to into root words, further cause the system to:
- format the plurality of words of the reference text data to eliminate data that does not contribute to the semantic meaning of the reference text words;
- separate the formatted plurality of words into tokens;
- normalize the tokens into root words.

20. A non-transitory computer-readable medium having instructions tangibly stored thereon, wherein the instructions, when executed by a processing unit of a system, cause the system to:
- generate a vector space from reference text data comprising a plurality of reference text words, wherein the vector space is defined by numerical vectors representative of semantic meanings of the reference text words, wherein there is a unique numerical vector representing each root word of the reference text words;
- convert a plurality of input text words into respective numerical vectors using the vector space, wherein each input text word is converted into a single respective numerical vector using the vector space;
- form the plurality of input text words into word clusters according to semantic similarity between the input text words, the word clusters defining respective nodes of a reference data structure, the semantic similarity between pairs of input text words being represented by respective metric values determined from respective pairs of numerical vectors, the metric values being used to determine whether a clustering criterion is satisfied;
- wherein the reference data structure is a hierarchical data structure, having leaf nodes at a lowest hierarchical level, wherein a leaf node is defined by a word cluster represented by a root word, and wherein two semantically similar leaf nodes are child nodes of a common parent node;
- apply, to each respective node of the reference data structure, a respective text label, the respective text label being representative of the semantic meaning shared by elements of the word cluster defining the respective node, the respective text label being a lowest common hyponym of the root words of the elements of the word cluster; and
- store the reference data structure in a memory of the system.

* * * * *